2,779,781
CYANIDATION CATALYSTS

Harry B. Copelin, Niagara Falls, N. Y., and George B. Crane, Wilmington, Del., assignors to E. I. du Pont de Nemours & Company, Wilmington, Del., a corporation of Delaware No Drawing. Application December 29, 1954,
Serial No. 478,542

20 Claims. (Cl. 260—465.8)

This invention relates to catalysts for the production of nitriles by the cyanidation of the corresponding organic halides. More particularly, it relates to catalysts for the production of adiponitrile by the cyanidation of 1,4-dichlorobutane.

The cyanidation of 1,4-dichlorobutane to produce the corresponding 1,4-dicyanobutane, adiponitrile, has become of increasing importance with the increase in the production of nylon. The reaction is generally carried out by direct interaction between the dichlorobutane and an inorganic cyanide such as sodium cyanide in an organic solvent. An equation may be written for this cyanidation as follows:

$$ClCH_2CH_2CH_2CH_2Cl + 2NaCN \rightarrow$$
$$CNCH_2CH_2CH_2CH_2CN + 2NaCl$$

A number of solvents have heretofore been proposed for this reaction including the alcohols of the MacCallum U. S. Patent 2,211,240 and the ether alcohols, especially methyl "Cellosolve," of the Rogers U. S. Patent 2,415,261.

Some of the reaction media suggested have given good results. When they are utilized, however, they introduce the problem of separating the solvent from the product. Elimination of this problem results if preformed adiponitrile, the reaction product, is itself used as the only solvent. Processes have accordingly been developed in which adiponitrile, alone except for a little water added to increase the solubility of the cyanide, serves as the reaction medium.

The adiponitrile solvent system suffers from several disadvantages, chief among which is the sluggishness of the cyanidation reaction when accomplished therein. The presence of water speeds up the reaction to some extent but it still remains undesirably slow. Another disadvantage of the adiponitrile solvent is that it forms an undue proportion of the intermediate cyanidation product delta-chlorovaleronitrile, 1 - chloro - 4 - cyanobutane. The failure of this intermediate to be converted to adiponitrile naturally decreases the yield of the latter.

A general object of the present invention is, consequently, to effect improvements in the process of making adiponitrile by cyaniding 1,4-dichlorobutane. Another object is to effect improvements in the cyanidation as it is carried out in adiponitrile solvent. Yet another object of the invention is to provide a method for accelerating the cyanidation of dichlorobutane in adiponitrile solvent. A further object is to provide a method for cyaniding dichlorobutane which minimizes the production of chlorovaleronitrile.

The above-mentioned and still further objects are accomplished in accordance with this invention by a process in which 1,4-dichlorobutane is reacted with an alkali metal cyanide in much the usual manner except that the adiponitrile solvent employed contains a small quantity of one or more of certain catalysts.

The catalysts of this invention are the quaternary ammonium compounds. Both monomers, i. e., simple or non-polymerized compounds, and polymers may be utilized, each having its preferred application. Suitable polymers are of the type known as anion-exchange resins.

Effective quaternary ammonium monomers include tetramethyl, trimethylbenzyl and tetrapropyl ammonium hydroxides and the corresponding chlorides, bromides and iodides. Monomeric quaternary ammonium compounds may, in fact, generally be used if they simultaneously fulfill the two requirements of solubility in the reaction mixture and of thermal stability at the temperature employed, i. e. a maximum of about 150° C. It may be noted that excessively hydroxylated compounds, tetrahydroxyethyl ammonium hydroxide in particular, are not effective as cyanidation catalysts since they lack heat stability.

The preferred polymeric quaternary ammonium anion-exchange resin is "Amberlite" IRA-400. "Amberlite" IRA-400 is the trade name of a resin sold by the Rohm and Haas Company. The resin is the chloride of the copolymer of vinyl pyridine and divinyl benzene quaternized with dimethyl sulfate. Other exchange resins may be substituted for the "Amberlite" IRA-400 including polyvinylpyridine cross-linked and quaternized with ethylene dibromide. Actually almost any quaternary ammonium anion-exchange resin will act as a cyanidation catalyst so long as it is heat-stable at the temperature employed.

Satisfactory polymeric quaternized compounds must, as noted, be like the monomers in possessing heat stability. Unlike the monomers, however, they need not be soluble in the reaction mixture. Preferably, in fact, insoluble polymers are used. Their insolubility eliminates most recovery problems since a simple filtration will remove the resin from the mixture without difficulty.

The quantity of quaternary ammonium compound used may be varied within rather wide limits. Between about 0.05 and 0.5% by weight of the soluble monomers is effective, although higher percentages can be used. Around 0.1% by weight is preferred in practice. These weights are based on the weight of adiponitrile solvent. The monomer is added to the reaction system in water solution, the concentration of which is not particularly critical.

A somewhat higher percentage of polymer than monomer is generally employed as a catalyst. A weight of resin corresponding to about 10–20% of the weight of the adiponitrile used as a solvent is added to the latter and serves effectively. Higher percentages can be used but are unnecessary. Lower percentages can also be used, down to about 5%, but are less effective.

The insoluble resins may be added directly in the form of rather large chunks or as somewhat smaller particles. Excessively fine material should be avoided to obviate difficulties in separation from the reaction mixture. Particles of 25–100 mesh, that is passing through sieves of 25 meshes per linear inch but retained on sieves having 100 meshes per linear inch, are satisfactory.

The temperature of the cyanidation is not sharply critical. Between about 95 and 150° C. gives the best results. If about 120° C. is utilized, the water in the cyanide solution can be largely removed by flash vaporization on contact with the reaction mixture. This technique, which may be preferred in some instances, is described and claimed in co-pending application Serial No. 408,582, filed February 5, 1954.

The pressure used above the reaction mixture during the cyanidation is likewise not particularly critical. For most purposes atmospheric pressure is adequate. In some cases, however, superatmospheric pressures may be desired and are serviceable. The pressure may also be reduced, as to 400 mm. of mercury.

The invention can be carried out in two principal embodiments, batch and continuous. In batch-wise operations 1,4-dichlorobutane and the equivalent amount of sodium cyanide contained in a 20% aqueous solution are added to preformed adiponitrile as a reaction solvent. For best results the solvent should constitute between about 20 and 80% by weight of the entire reaction mixture. The quaternary ammonium compound is then added to the mixture and the cyanidation carried out, most conveniently with agitation, at 95°–150° C. in the known manner. Quaternary ammonium monomers are very convenient for use in batch reactions. They may be added in the desired amount, i. e. 0.05–0.5% by weight of the solvent, either in a separate aqueous solution or in the cyanide solution. Polymeric resins may also be used in batch operations but here are less preferred than the monomers. A small amount of water, e. g. around 2–8%, is preferably retained in the system when the monomers are used to facilitate the solution of the latter. It may be noted, however, that the reaction proceeds smoothly even in the presence of much larger quantities of water.

The continuous and preferred mode of operation is readily carried out by feeding 1,4-dichlorobutane and sodium or other alkali metal cyanide into a reaction vessel containing adiponitrile solvent and particulate anion-exchange resin. Usable hold-up times in the system are between about 20–30 minutes and 2–4 hours, with about 80–200 minutes preferred. Cyanidation is accomplished at temperatures within the 95°–150° C. range noted above. Adiponitrile is withdrawn at a rate equal to the input rate of the reactants and the process continued indefinitely. One charge of resin is sufficient to catalyze the formation of several thousand times its volume of adiponitrile. The resin may easily be kept in the reaction vessel by screens placed over the various openings therein.

This invention has been described with particular reference to the production of adiponitrile. It is not, however, so narrowly restricted. Quaternary ammonium catalysts, which seem to act as cyanide carriers, may generally be used to expedite the cyanidation of organic halides. Their greatest utility is, of course, in solvent systems where the reaction proceeds slowly in their absence. These systems include particularly solvents in which the inorganic cyanide utilized is relatively insoluble.

The invention will be understood in more detail from the examples which follow. In these examples, unless otherwise noted, all percentages are weight percentages.

EXAMPLE 1

This experiment shows the catalytic effect of quaternary ammonium compounds on the cyanidation of chlorovaleronitrile.

A series of batch cyanidations of chlorovaleronitrile in adiponitrile solvent was carried out at 140° C. and at atmospheric pressure using various monomeric quaternary ammonium compounds as catalysts.

In each run the basic charge, to which the catalyst was added where used, consisted of 600 g. of adiponitrile solvent, 40 g. of delta-chlorovaleronitrile, 12.0 g. of water and 100 g. or 600% of the theoretical weight of sodium cyanide, the last mentioned being added as a solid. Catalysts and results are shown in Table I.

Table I.—Batch cyanidation of 1,4-chlorovaleronitrile

| Run | Catalyst | | | Conversion (percent) | | | Initial Conversion Rate (moles/min.) |
|---|---|---|---|---|---|---|---|
| | Name | Wt. (g.) | Moles | 10 min. | 30 min. | 60 min. | |
| 1 | None | | | 31.4 | 74.2 | 96.0 | 0.0107 |
| 2 | [1] TMAH | 0.6 | 0.0065 | 76.3 | 96.0 | 97.0 | 0.0265 |
| 3 | TMAH | 1.0 | 0.0100 | 84.0 | 99.0 | 99.7 | 0.0370 |
| 4 | [2] TMACl | 0.71 | 0.0065 | 75.5 | 95.5 | 97.0 | 0.0260 |

[1] Tetramethyl ammonium hydroxide.
[2] Tetramethyl ammonium chloride.

EXAMPLE 2

This example shows the batch-wise cyanidation of 1,4-dichlorobutane using a quaternary ammonium catalyst.

The runs of Example 1 were substantially repeated except that, in each case, 22 g. of 1,4-dichlorobutane was substituted in the charge for the chlorovaleronitrile and theoretical amounts only of sodium cyanide (17.5 g.) were utilized. Results are shown in Table II.

Table II.—Batch cyanidation of 1,4-dichlorobutane

| Run | Catalyst | | | Conversion (percent) at End of 10 minutes | Initial Conversion Rate (moles/min.) |
|---|---|---|---|---|---|
| | Name | Wt. (g.) | Moles | | |
| 5 | None | | | 16.6 | 0.0057 |
| 6 | TMAH | 0.60 | 0.0065 | 31.3 | 0.0096 |
| 7 | TMACl | 0.71 | 0.0065 | 30.4 | 0.0106 |

EXAMPLE 3

This example illustrates a continuous cyanidation of 1,4-dichlorobutane without a catalyst and is included as a control.

Four hundred grams of adiponitrile were added to a 2-liter reaction vessel and heated with agitation to 100° C. 2.2 ml./min. of 1,4-dichlorobutane and 9.7 ml./min. of 20% aqueous NaCN were then fed for 7 hours into the vessel and the products were allowed to overflow. Water was returned to the reactant mixture by a reflux condenser. Distillation analysis of the product at the end of 7 hours showed 6.4% conversion of dichlorobutane to adiponitrile at 92.5% yield.

EXAMPLE 4

This example shows continuous cyanidation in the presence of a preferred catalyst.

Four hundred grams of adiponitrile and 50 g. of "Amberlite" IRA-400 resin were added to a 2-liter reaction vessel and heated with agitation to 100° C. The reaction was carried out as before with a dichlorobutane feed of 2.2 ml./min. and a 20% aqueous NaCN feed of 9.1 ml./min. Distillation analysis after five hours showed 28.2% conversion of dichlorobutane to adiponitrile at 97.5% yield.

EXAMPLE 5

This example is another control run, i. e. without catalyst, carried out at reduced pressure.

Two thousand grams of adiponitrile were added to the reaction vessel and heated with agitation to 120° C. under a pressure of 400 mm. of mercury. 1,4-dichlorobutane was fed to the reaction vessel as a 41% solution by weight in adiponitrile at 21.0 ml./min. and 35% aqueous NaCN was added at 16.6 ml./min. The water was allowed to flash off, dichlorobutane which distilled out being returned to the reactor by an automatic decanter. The organic liquid salt slurry formed was allowed to overflow from the reactor. At the end of 5.5 hours distillation analysis of the product showed 18.2% conversion of dichlorobutane to adiponitrile at 83.2% yield.

EXAMPLE 6

This example shows a catalyzed cyanidation carried out at reduced pressure.

The run of Example 5 was substantially repeated except the 0.04 mol of tetramethyl ammonium chloride were utilized per mole of dichlorobutane fed. The catalyst was dissolved in the sodium cyanide feed solution for addition. At the end of 5 hours, distillation analysis of the product showed 89.4% conversion of dichlorobutane to adiponitrile at 94.8% yield.

Having described our invention, we claim:

We claim:

1. In the process for making organic cyanides by the cyanidation of the corresponding organic halides, the improvement which comprises accomplishing said cyanidation in the presence of an effective catalytic amount of a quaternary ammonium compound stable at the temperature employed for the cyanidation.

2. The invention of claim 1 in which the quaternary ammonium compound is monomeric.

3. The invention of claim 2 in which the quaternary ammonium compound is a member of the group consisting of tetramethyl, trimethylbenzyl and tetrapropyl ammonium hydroxides and the halides thereof.

4. The invention of claim 1 in which the quaternary ammonium compound is an anion-exchange resin.

5. The invention of claim 4 in which the anion-exchange resin is a copolymer of vinyl pyridine and divinyl benzene quaternized with dimethyl sulfate.

6. In the process for making adiponitrile by the cyanidation of 1,4-dichlorobutane in solvent adiponitrile, the improvement which comprises supplying to said solvent an effective catalytic amount of a quaternary ammonium compound stable at the reaction temperature employed.

7. The invention of claim 6 in which the solvent adiponitrile contains a small amount of water.

8. The invention of claim 7 in which the quaternary ammonium compound is monomeric.

9. The invention of claim 8 in which the quaternary ammonium compound is a member of the group consisting of tetramethyl, trimethylbenzyl and tetrapropyl ammonium hydroxides and the halides thereof.

10. The invention of claim 7 in which the quaternary ammonium compound is an anion-exchange resin.

11. The invention of claim 10 in which the anion-exchange resin is a copolymer of vinyl pyridine and divinyl benzene quaternized with dimethyl sulfate.

12. The method of preparing adiponitrile which comprises reacting 1,4-dichlorobutane with an alkali metal cyanide in solvent adiponitrile in the presence of an effective catalytic amount of a quaternary ammonium compound stable at the reaction temperature employed.

13. The method of claim 12 in which the cyanidation temperature is between about 95° C. and 150° C.

14. The method of claim 13 in which the solvent adiponitrile contains additionally a small amount of water.

15. The method of claim 14 in which the quaternary ammonium compound is water-soluble.

16. The method of claim 15 in which the quaternary ammonium compound is a member of the group consisting of tetraethyl, trimethylbenzyl and tetrapropyl ammonium hydroxides and the halides thereof.

17. The method of claim 14 in which the quaternary ammonium compound is an anion-exchange resin.

18. The method of claim 17 in which the anion-exchange resin is a copolymer of vinyl pyridine and divinyl benzene quaternized with dimethyl sulfate.

19. The continuous process of producing adiponitrile which comprises continuously feeding liquid 1,4-dichlorobutane into solvent adiponitrile containing a small quantity of water and an effective catalytic amount of a quaternary ammonium compound stable at the reaction temperature employed, continuously feeding into the solvent adiponitrile an aqueous solution containing a quantity of a cyanide of an alkali earth metal chemically equivalent to the quantity of 1,4-dichlorobutane, continuously catalytically reacting said 1,4-dichlorobutane with said cyanide and continuously withdrawing from the solvent adiponitrile a volume of reaction products, including adiponitrile and water, equal to the volume of liquid simultaneously fed thereinto.

20. The continuous process of claim 19 in which the quaternary ammonium compound is an anion-exchange resin formed by quaternizing with dimethyl sulfate a copolymer of vinyl pyridine and divinyl benzene.

References Cited in the file of this patent

UNITED STATES PATENTS

| | | |
|---|---|---|
| 2,361,259 | Bruson | Oct. 24, 1944 |
| 2,415,261 | Rogers | Feb. 4, 1947 |
| 2,547,686 | Brockway | Apr. 3, 1951 |